United States Patent [19]

Thoreson

[11] Patent Number: 5,235,847
[45] Date of Patent: Aug. 17, 1993

[54] ARRANGEMENT FOR DETECTION OF LEAKAGE OR WEAK POINTS IN A PACKAGE MOVEABLE CONTINUOUSLY RELATIVE TO THE ARRANGEMENT

[75] Inventor: Anders Thoreson, Rimforsa, Sweden

[73] Assignee: Nikka Densok Limited, Japan

[21] Appl. No.: 681,535

[22] PCT Filed: Nov. 6, 1989

[86] PCT No.: PCT/SE89/00634
  § 371 Date: May 7, 1991
  § 102(e) Date: May 7, 1991

[87] PCT Pub. No.: WO90/05290
  PCT Pub. Date: May 17, 1990

[30] Foreign Application Priority Data
  Nov. 7, 1988 [SE] Sweden .......................... 8804013

[51] Int. Cl.⁵ ............................................ G01M 3/016
[52] U.S. Cl. ................................... 73/52; 324/558
[58] Field of Search .................... 73/49.3, 52, 41, 45, 73/45.4; 340/603, 605; 324/558, 559; 209/530

[56] References Cited

U.S. PATENT DOCUMENTS

| | | | |
|---|---|---|---|
| 3,789,297 | 1/1974 | Frolich | 324/694 |
| 4,125,805 | 11/1978 | Nagamatsu et al. | 324/558 |
| 4,431,961 | 2/1984 | Kakumoto | 324/558 |

FOREIGN PATENT DOCUMENTS 1399161 6/1972 United Kingdom .

*Primary Examiner*—Hezron E. Williams
*Assistant Examiner*—Nashmiya Ashraf
*Attorney, Agent, or Firm*—Lerner, David, Littenberg, Krumholz & Mentlik

[57] ABSTRACT

A detector for detecting leakage or weak points in a package which is continuously moveable relative to the detector includes a detector element which is resiliently mounted for movement transverse to the feed direction of the package. The detector element includes at least one electrical conductor and a guiding part for guiding the electrical conductor toward that part of the package which is to be detected.

11 Claims, 4 Drawing Sheets

ARRANGEMENT FOR DETECTION OF LEAKAGE OR WEAK POINTS IN A PACKAGE MOVEABLE CONTINUOUSLY RELATIVE TO THE ARRANGEMENT

FIELD OF THE INVENTION

The present invention relates to detectors for detecting leakage or weak points in a package which is continuously movable relative to the detectors. The detectors are particularly intended to be used for packages having an outwardly extended flange along which a cover is sealed to the package. The contents of the package are thereby maintained in the inner volume or interior of the package.

A detector element provided with such detector has at least one electrical conductor forming part of an electrical circuit. The circuit includes a pole forming a coupling to the package interior, and any leakage or weak points along the sealed region of the package cause a change in the electrical conditions of the circuit.

BACKGROUND OF THE INVENTION

It previously has been known to use relatively large detector electrodes to detect large surfaces of a package, in which respect no particularly great requirements are set on the position of the detector electrode relative to the package. However, large contact surfaces between the package and the detector create considerable interference problems. It is also known to use smaller detector elements with a relatively limited detector surface, which necessitates accurate tolerances between the detector elements and the portion of the package to be detected or, alternatively, to provide the detector element with arrangements for displacing the detector element according to the dimensions of the package.

Further, GB A 1,399,161 discloses a leakage indicator which requires the package to be submersed into a container of liquid and an electrode to be inserted through the wall of the package. Also, U.S. Pat. No. 3,789,297 shows a pair of electrodes mounted adjacent a seal, requiring both electrodes to contact the electrically conductive fluid for indication.

SUMMARY OF THE INVENTION

The aim of the present invention is to eliminate the above-mentioned problems and to provide a very limited detector surface, while at the same time ensuring in a simple manner that the detector surface is at all times situated in the position where detection is to take place.

In accordance with the present invention, this aim is achieved by means of a detector including a detector element extending from a control unit, with the detector element presenting at least one electrical conductor in the form of a detector electrode, and guiding means for guiding the detector electrode toward that part of the package which is to be detected In accordance with the invention, the detector element is resiliently attached to the control unit to permit displacement of the detector element transversely to the feed direction of the package.

BRIEF DESCRIPTION OF THE DRAWINGS

The invention will be described in greater detail below on the basis of exemplary embodiments and with reference to the attached drawings, in which.

DETAILED DESCRIPTION OF THE PREFERRED EMBODIMENTS

Figure 1:
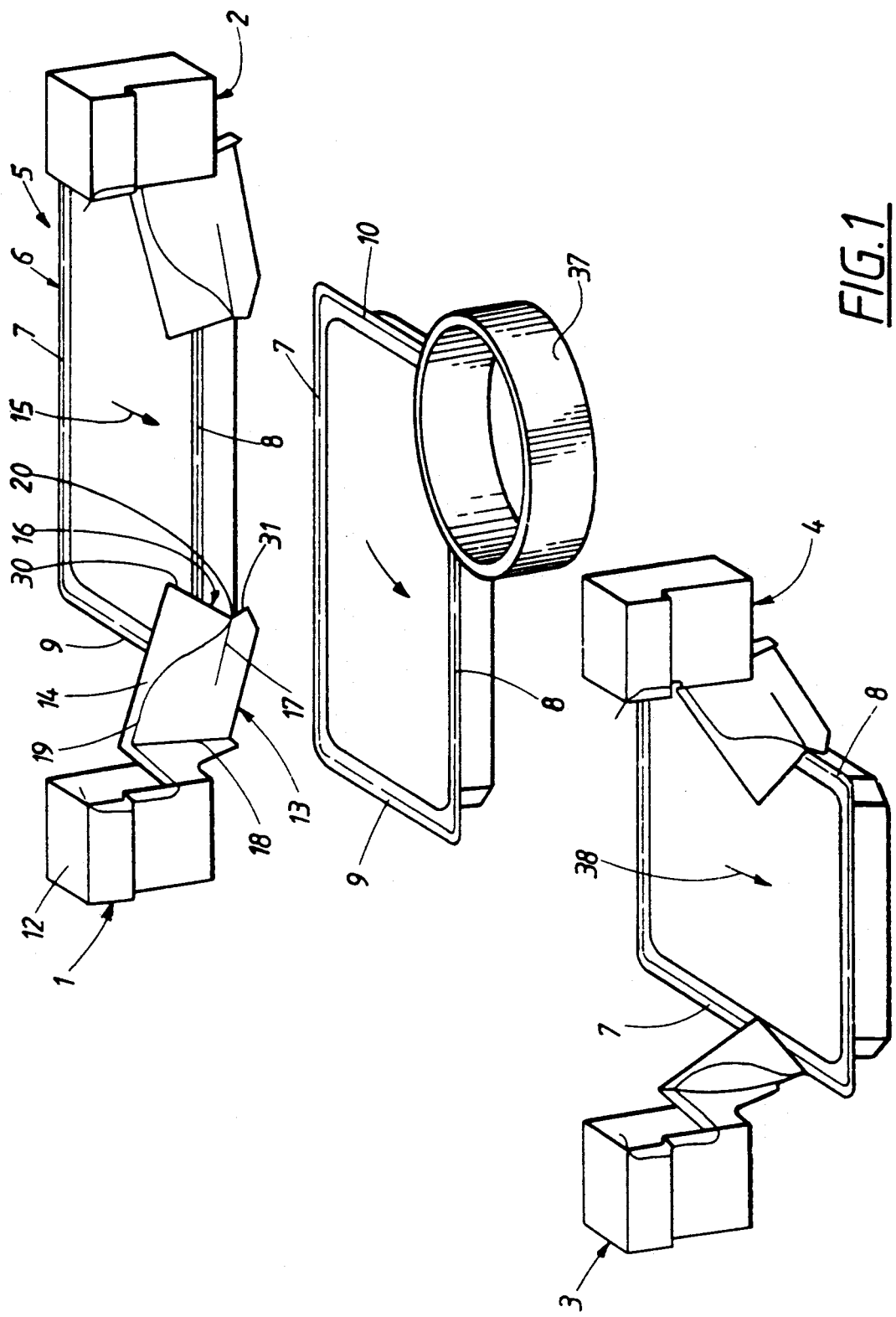
FIG. 1 is a perspective view of a first embodiment of a complete detector system for detecting all four sides of a package.
Figure 2:
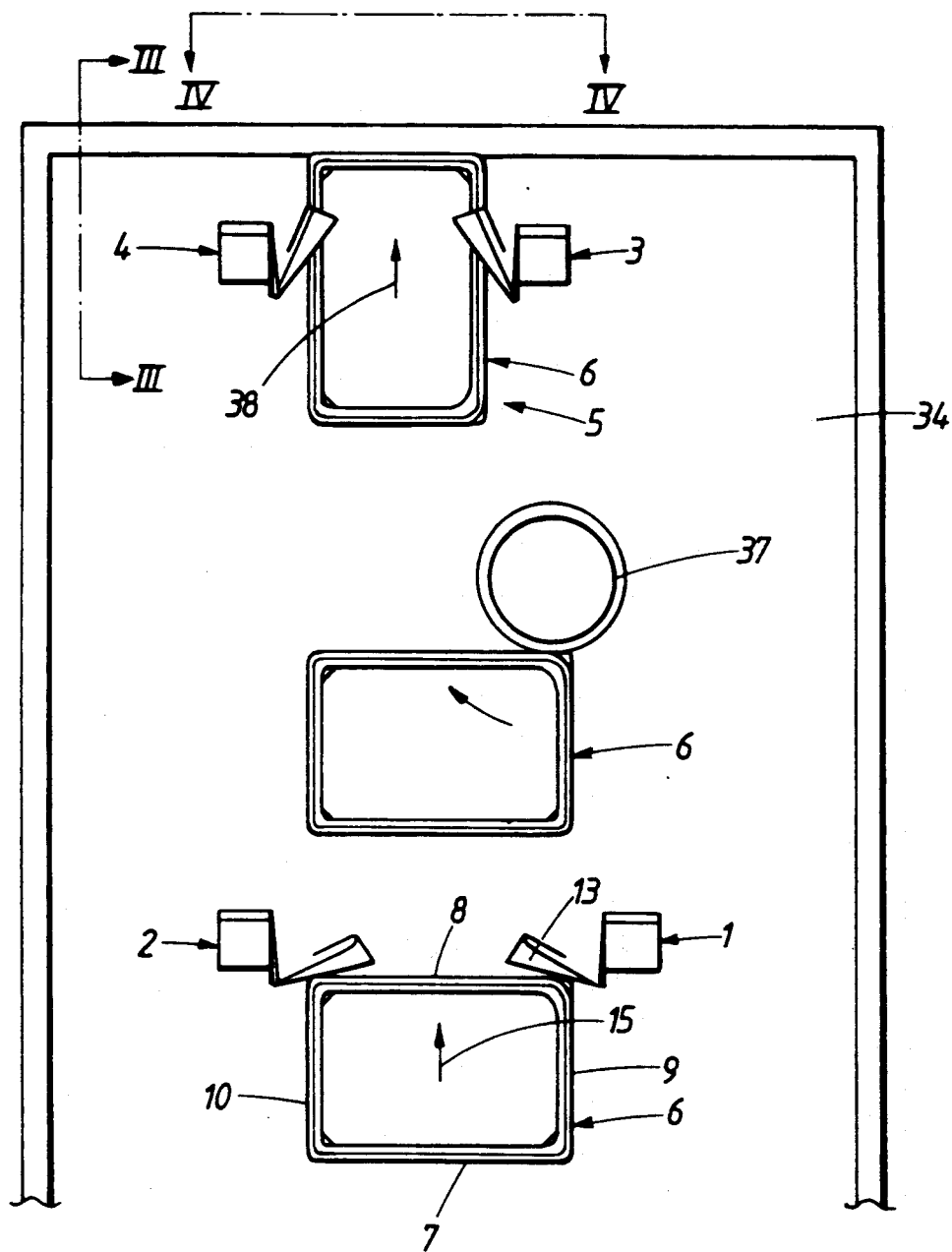
FIG. 2 is a plan view of the detector system of FIG. 1.

FIGS. 1 and 2 show the mechanical part of a complete detector installation in accordance with a first embodiment of the invention consisting of four detectors 1, 2, 3, 4 for detecting leakage or weak points in a package. In the example shown, a circumferential welding seam along the edge sections 6 of a package 5 is detected. These edge sections run in a rectangular manner with pairs of edge sections opposite each other, namely two longitudinal edge sections 7, 8 and two end edge sections 9, 10. The edge sections 7-10 are designed as protruding, laterally directed flanges and the welding seam is designed to seal a foil 11 to the flanges of the packaging container, which foil 11 covers the top of the package and thus seals the package contents therein, the contents being a solid or viscous material which is electrically conductive and which tends to leak out through the welding seam at defect points along the edge sections. In the example shown, the abnormal state is therefore leakage of the contents through a weak point in a welding seam in the package. The detectors include a control or indicating unit 12 in the form of a box placed alongside the conveyor belt on which the package 5 is fed past the detector installation In the example shown, a detector element or arm 13 is attached to the box 12 of each detector. The detector installation consists of two detecting stations, a first station with two detectors 1, 2 placed on either side of the advancing packages 5 for detecting the end edge sections 9, 10 of the package, and a subsequent station with two detectors 3, 4 for detecting the longitudinal edge sections 7, 8 of the package.

Each of the detectors 1-4 has the said detector element 13 which, in the example shown, is secured to the associated box 12 in such a way that the detector element extends partially across the feed path along which the packages which are to be detected are fed. The detector elements 13 have a guiding part 14 which is supported in an elastically resilient manner so that the guiding part can be displaced in a spring-like manner in a transverse direction relative to the feed direction of the packages, which is indicated by arrows 15, 38. In addition, the guiding part 14 is designed to move in the vertical direction in order to adapt to different heights of packages 5 and, more specifically, to the vertical position above the conveyor belt of that part of the package which is to be detected, in this case the edge sections 7, 8, 9, 10. As illustrated, the front end of the guiding part 14 is in the form of a V since the guiding part is folded once about an essentially horizontal fold line 17 and can be displaced in a spring-like manner since the guiding part 14 is pivotable about an essentially vertical fold line 18 which, as a result of an appropriate choice of material for the detector element, affords a spring-back function. The detector elements 13 are made, for example, from a semi-rigid plastic film, expediently in the form of two plastic films welded together with an electrical conductor 19 lying between them. The front end of this conductor is positioned in the tip 20 of the V and is exposed there so that the conductor can come into conducting contact with that part of the package which is to be detected.

Figure 5:
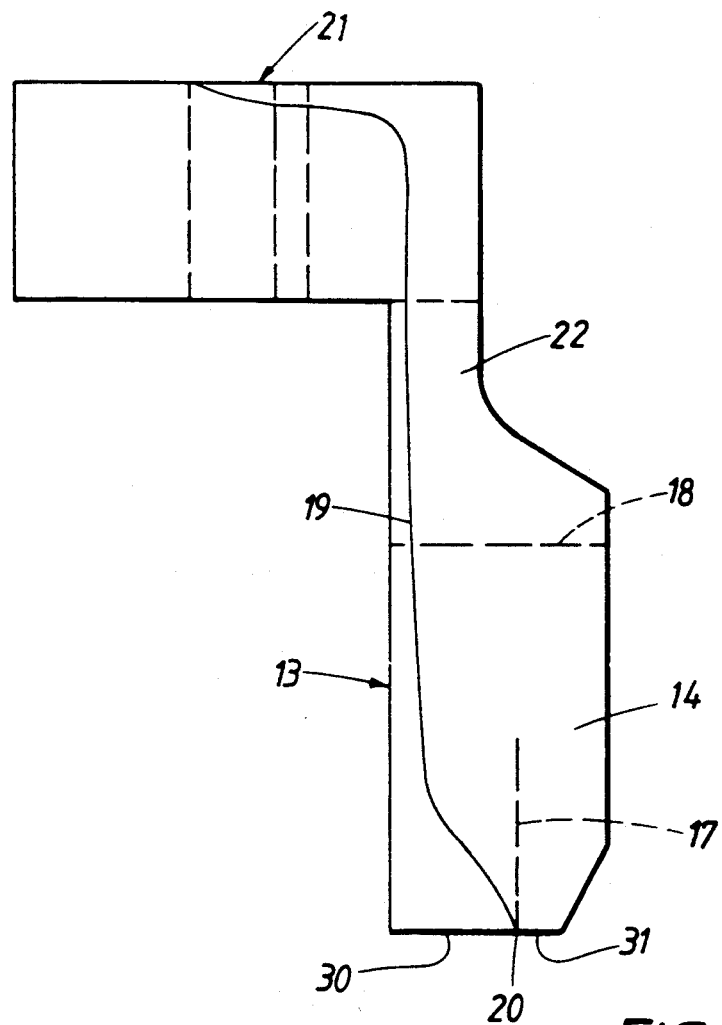
FIG. 5 is an extended view of a detector element used in the first embodiment of the detector system of the present invention.

FIG. 5 shows an example of a detector element in the extended state. This shows that, in addition to the guiding part, the detector element has an attachment part 21 at which the electrical conductor 19 leaves the detector element. Between the guiding part and the attachment part there is a narrowed portion 22 by means of which the guiding part 14 is made movable in the vertical direction in the assembled state of the detector, by means of which self-positioning is permitted.

Figure 6:
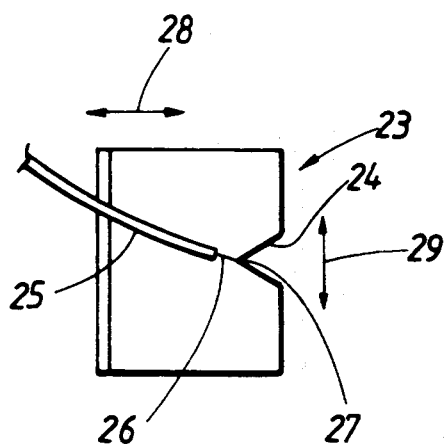
FIG. 6 is a highly schematic view of the detector element in accordance with the present invention.

FIG. 6 shows more diagrammatically a detector element variant 23 which consists of a V-shaped recess 24 in a plate which is secured in a frame which is elastically resilient. Alternatively, the detector element itself can be elastically resilient, for example by being bent in such a way that it is angled relative to the transverse direction and is thus displaceable in a spring-like manner relative to the package. The electrical conductor 25 is exposed at its front end and is situated with this end at the tip 27 of the V-shaped recess 24. The arrows 28 and 29 symbolize the movement directions in which the detector element moves during a guiding procedure, namely, the transverse direction and vertical direction. The two guide edges of the self-guiding part converge toward the detector electrode and form an oblique angle to the transverse direction. By means of the guide edges of the detector element, a vertical component of force arises when either guide edge is contacted by the edge sections of the package. This vertical component of force acts on the guiding part in such a way that the guiding part adopts a position at which the edge sections of the package are aligned with tip of the V. This component must be greater than the force which holds the guiding part in the neutral vertical position which is assumed when the detector element is not acted upon by any package.

Figure 3:
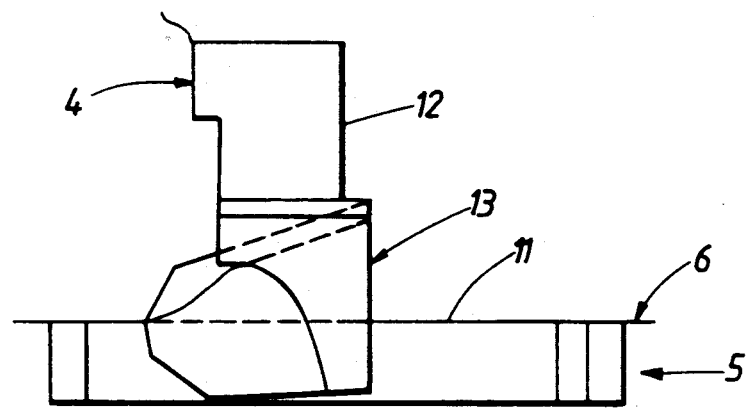
FIG. 3 is a highly schematic sectional view taken along line III—III in FIG. 2.
Figure 4:
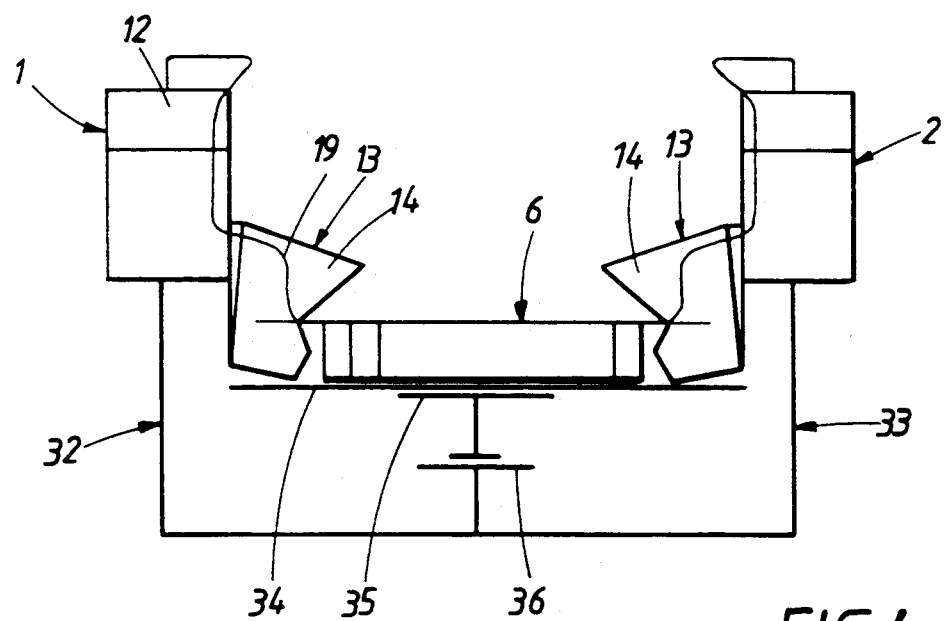
FIG. 4 is a sectional view taken along line IV—IV in FIG. 2.

When a package 5 arrives at the first detecting station with the two detectors 1, 2, the latter are passed continuously, in which respect the two detector elements 13 projecting into the path of the package are displaced by the edge sections of the package, in practice first by the corners of the package. In this respect, the detector elements yield by pivoting about an axis 18, and when the end edge sections 9, 10 come into contact with the end of the guiding part 14, more particularly with one of its two end sections 30, 31 converging toward the tip 20, the guiding part 14 is automatically positioned by means of the tendency of the detector elements to bear with spring force against the end edge sections 9, 10 in such a way that these pass the detector element at the tip 20 where the electrical conductor 19 is exposed. This is best seen in FIG. 3 and FIG. 4, where the guiding parts 14 have been guided depending on the height of the package 5, and more particularly the vertical position of the edge sections. With reference to FIG. 4, it should be added that the detector includes an electrical circuit 32, 33 for each detector 1, 2, which circuit also includes the package and, more particularly, its inside, i.e. its contents, which are electrically conductive, while the shell is electrically insulating. The circuit includes a pole 35 which is placed under the advanced packages, for example under the conveyor belt 34 which supports the packages, this pole 35 forming a capacitive coupling to the contents of the package. The circuit also includes a current source 36 and the control and indicating unit 12. Also connected to this circuit is the electrical conductor 19, whose front end is exposed.

The normal state for the package 5 is when the package is completely closed and thus electrically insulating because the welding seam between the flanges and the covering foil of the package is complete, and the edge sections of the package are therefore electrically insulating. An abnormal state is when the welding seam is weakened or is not leakproof, and the contents have leaked out from the inside of the package, this being detected by means of the contents of the package coming into electrical contact with the free end of the conductor, in which respect the electrical circuit is closed, resulting in a change in the electrical magnitudes therein. This is indicated in a manner known per se by means of the control and indicating unit 12, for example by illumination of a signal lamp, activation of an acoustic signal or activation of a deflector following the detector station to deflect to the defective package to a container or branch line. The current in the electrical circuit can be direct current or alternating current. Furthermore, the current voltage and frequency can lie within wide limits. However, it is advantageous to select a voltage of such a level that flash-over can occur at the distance which can arise between the tip of the electrode and the contained goods. By means of the accurate guiding of the detector electrode which the free end of the electrical conductor 19 represents, the detector electrode can be given a very small surface which provides for a highly sensitive and interference-free detection.

The downstream detecting station shown in FIGS. 1 and 2 detects the longitudinal edge sections 7, 8 in a corresponding manner by means of the package being rotated 90° in a simple manner by striking against a round turning device 37 as it advances, which device forms a turning station. The packages are in this way advanced in their longitudinal direction and are fed between the two detectors 3, 4.

Figure 7:
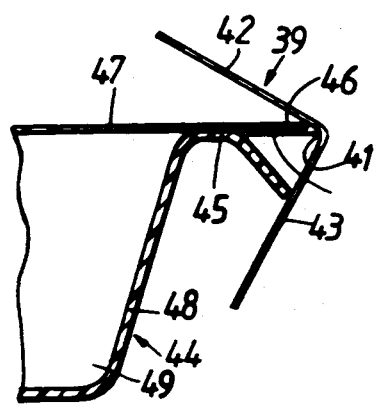
FIG. 7 is a cross-sectional view through a further embodiment of the detector element.

FIG. 7 shows a further variant of the detector element, here designated by numeral 39. Its principal design, like the detector as a whole, can be the same as in FIG. 1. The difference in detector element 39 is that the detector electrode 40 is elongated in such a way that it projects a distance from the V-shaped tip 41, which is formed by the two guiding parts 42, 43. In the example shown, the detector electrode is made up of a wire-shaped electrical conductor which extends out from the free end of the element at its tip 41. The electrode is advantageously made slightly resilient.

The detector element 39 according to FIG. 7 is intended to be used for packages 44 in which the region 45 which is to be checked is not situated in direct contact with that edge 46 of the package against which the guiding edges 42, 43 of the detector element abut to guide the detector electrode 40. An example of this type of package is shown in FIG. 7 in partial cross-section. In this case, the edges 46 of the package against which the detector element is guided project beyond the elongate weld joint 45 between the cover 47 and the container part 48. The extended electrode 40 thus reaches a distance in under the edges of the cover, it being possible for the width of these edges beyond the weld joint 45 to vary somewhat without the detection function being impaired. A weak point or a leak from the inner container space 49 of the container part 48 through the weld joint is detected by the same method as has been described above. In addition, as shown in FIG. 7, the flange 50 of the container part is often provided with a portion 51 angled downwardly from the edge 46 of the cover, as a result of which the package with this portion also provides for a guiding of the electrode 40 for fine adjustment of the rough guiding which the detector element provides for in cooperation with the edge 46.

The invention is not limited to the exemplary embodiments described above and shown in the drawings. For example, the detector elements can have another shape for detecting a weld seam. However, the detected object must have a projecting edge so that guiding by means of the guiding part is permitted. The electrical circuit can be formed by a coupling other than a capacitive coupling, depending on the type of current used and the electrical properties of the package contents. In principle, a leakage detector can consist of a single detector with one or more detector elements. In addition, these can be secured on a separate retainer and do not need to be secured to the box 12. As a result of the spring-like self-adjustment, the detected part can vary along its length both in the vertical direction and in the lateral direction; for example, it can be wave-shaped. Abnormal states other than leakage can be detected, such as weak points in a package part, which can result in altered electrical conditions.

Detection in the case of packages with an air volume above the packaged goods (so-called head space) can be carried out by means of the packages being inverted and subjected to the previously described detection procedure, if appropriate, after shaking the goods down in the package with the package in the inverted state.

I claim:

1. An apparatus for detecting a condition in a measurement region of a package traveling along a path in a feed direction generally parallel to a support surface on which the package travels, said package including a flange extending outwardly from a periphery of said package and a cavity containing electrically conductive contents and said package being electrically insulating, said apparatus comprising
    a base,
    a detector arm moveably mounted with respect to said base for movement in a first direction transverse to said feed direction of said package,
    biasing means for biasing said detector arm toward a rest position located in said path of said package,
    a detector electrode connected to a free end of said detector arm,
    guide means for guiding said free end of said detector arm and said package relative to one another, said guide means including two guide edges converging to an apex and adapted for mating engagement with said flange of said package to thereby position said detector electrode to juxtapose said measurement region of said package, said detector electrode being positioned at said apex whereby said two guide edges guide said detector electrode toward said flange,
    electrical circuit means for imposing an electrical potential difference between said electrically conductive contents in said package and said detector electrode so that a first signal will be generated when said measurement region is in a first condition and a second signal different than said first signal will be generated when said measurement region is in a second condition, and
    signal means for differentiating between said first and second signals.

2. The apparatus as claimed in claim 1, wherein said detector arm includes an attachment end and a free end including said two guide edges, said two guide edges in said rest position of said detector arm lying in a plane disposed at an oblique angle with respect to said feed direction of said package.

3. The apparatus as claimed in claim 1, wherein said detector electrode extends from said apex toward said measurement region of said package.

4. The apparatus as claimed in claim 1, wherein said detector arm is formed from an elastically resilient, electrically insulating sheet material.

5. The apparatus as claimed in claim 4, wherein said sheet material includes a fold line forming two confronting faces and said guide edges are defined by converging edges of said confronting faces.

6. The apparatus as claimed in claim 1, wherein said detector arm is mounted for movement in a second direction transverse to said support surface.

7. The apparatus as claimed in claim 1, wherein said biasing means includes an attachment member for mounting said detector arm with respect to said base, said attachment member comprising an elastically resilient, electrically insulating sheet material having a fold line directed transversely to said support surface.

8. The apparatus as claimed in claim 7, wherein said attachment member has a predetermined width in a direction transverse to said support surface, said attachment member including a neck region having a width which is less than said predetermined width for permitting movement of said detector arm in said direction transverse to said support surface.

9. The apparatus as claimed in claim 1, wherein said signal means includes indicating means for indicating generation of said first and second signals.

10. The apparatus as claimed in claim 1, wherein said electrical circuit means includes a source of alternating current and an electrode positioned adjacent said package in capacitive communication with said electrically conductive contents of said package.

11. The apparatus as claimed in claim 1, further comprising feed means for feeding said package along said path in said feed direction.

* * * * *